(12) United States Patent
Simecek et al.

(10) Patent No.: US 11,407,341 B2
(45) Date of Patent: Aug. 9, 2022

(54) LEG EXTENSION CONTROL DEVICES AND SYSTEMS FOR VEHICLE SEATING

(71) Applicant: B/E Aerospace, Inc., Winston-Salem, NC (US)

(72) Inventors: Gregory J. Simecek, Winston-Salem, NC (US); Jeff B. Thompson, Lewisville, NC (US); Bradley D. Barg, Advance, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 505 days.

(21) Appl. No.: 16/429,605

(22) Filed: Jun. 3, 2019

(65) Prior Publication Data

US 2020/0376989 A1 Dec. 3, 2020

(51) Int. Cl.
*B60N 2/90* (2018.01)
*B64D 11/06* (2006.01)
*B60N 2/42* (2006.01)
*B60N 2/50* (2006.01)

(52) U.S. Cl.
CPC ............... *B60N 2/42* (2013.01); *B60N 2/501* (2013.01); *B60N 2/995* (2018.02); *B64D 11/06* (2013.01)

(58) Field of Classification Search
CPC ...... B60N 2/442; B60N 2/995; B60N 2/2727; B60R 21/02; B60R 21/04; B60R 21/055; B60R 2021/23176; B60R 2021/0093; B60R 2021/0273; B64D 11/06; B64D 11/0621
USPC ....................................................... 296/68.1
See application file for complete search history.

(56) References Cited

U.S. PATENT DOCUMENTS

| | | | | |
|---|---|---|---|---|
| 2,864,432 A | * | 12/1958 | Limberg | B60N 2/20 297/378.11 |
| 5,294,175 A | * | 3/1994 | Elton | B60N 2/4221 297/216.1 |
| 5,476,283 A | * | 12/1995 | Elton | B60R 7/06 280/752 |
| 6,217,059 B1 | * | 4/2001 | Brown | B60R 21/16 280/730.1 |
| 9,296,317 B2 | | 3/2016 | Meister et al. | |
| 2002/0185847 A1 | * | 12/2002 | Khoudari | B60R 21/231 280/730.1 |

(Continued)

FOREIGN PATENT DOCUMENTS

| | | | | |
|---|---|---|---|---|
| CN | 111152745 A | * | 5/2020 | |
| WO | WO-2020231511 A1 | * | 11/2020 | B60R 21/232 |

*Primary Examiner* — Hilary L Gutman
(74) *Attorney, Agent, or Firm* — Suiter Swantz pc llo

(57) ABSTRACT

A safety system includes a safety response device positioned proximal to an aircraft seat. The safety response device is operable to deploy thereby controlling the leg extension condition of legs of an occupant of the aircraft seat. A triggering system is operable to activate the safety response device when a deceleration is detected. The safety response device can be operable to maintain the legs of a seated occupant in an un-extended condition thereby protecting the legs from extending when a rapid deceleration occurs. The safety response device can be operable to transition the legs of a seated occupant from an un-extended condition to an extended condition at a predetermined rate. The safety response device can be, for example, and airbag or a kick plate. The device may automatically return to a stowed condition a predetermined time after deployment to permit egress from the seat and aircraft.

6 Claims, 8 Drawing Sheets

(56) References Cited

U.S. PATENT DOCUMENTS

| | | | |
|---|---|---|---|
| 2014/0027574 A1* | 1/2014 | Obadia | B60R 21/20 |
| | | | 244/121 |
| 2018/0201215 A1* | 7/2018 | El-Jawahri | B60R 21/16 |
| 2018/0265027 A1* | 9/2018 | Nusier | B60R 21/16 |
| 2021/0229616 A1* | 7/2021 | Shrivatri | B60R 21/233 |

* cited by examiner

LEG EXTENSION CONTROL DEVICES AND SYSTEMS FOR VEHICLE SEATING

BACKGROUND

Vehicle seats such as aircraft passenger seats are commonly equipped with seat belts and other safety response devices such as airbags that deploy to protect a passenger's upper body and head. However, a passenger's legs are vulnerable to injury as well. The legs of a seated occupant can sustain injuries with or without violently contacting structures forward of the passenger seat.

In a crash or other rapid deceleration event, an unrestrained leg can extend forward by inertia. The kinetic energy of such action can cause bending moments and stresses in the femur, knee joint, lumbar, and other areas of the body, all of which can sustain injury. In a situation where rapid evacuation of an aircraft is needed, primary injuries to the legs that are non-lethal themselves can slow or prevent locomotion and escape of the injured.

Accordingly, improvements are needed in safety systems for protecting the legs of aircraft seat occupants during rapid deceleration and crash events.

SUMMARY OF THE INVENTIVE ASPECTS

To achieve the foregoing and other advantages, an inventive aspect disclosed herein is directed to a safety system for protecting the legs of an occupant of an aircraft seat including a safety response device positioned proximal to an aircraft seat. The safety response device is operable to deploy thereby controlling the leg extension condition of legs of an occupant of the aircraft seat. A triggering system is operable to activate the safety response device when a deceleration is detected.

In some embodiments, the safety response device is operable, when activated by the triggering system, to maintain the legs of a seated occupant in an un-extended condition thereby protecting the legs from extending when a rapid deceleration occurs.

In some embodiments, the safety response device deploys an airbag forward of the leg rest of the aircraft seat.

In some embodiments, the safety response device is mounted on the aircraft seat or on a fixed structure forward of the leg rest of the aircraft seat.

In some embodiments, the safety response device is floor-mounted, and, when in a stowed and undeployed condition thereof, is flush with or below a surface of a floor forward of the aircraft seat.

In some embodiments, the safety response device deploys a kick plate from a floor forward of the aircraft seat.

In some embodiments, the kick plate is biased to a raised position by a spring actuator.

In some embodiments, the kick plate deploys by pivoting rearward about a rearward end thereof pivotally attached to the floor.

In some embodiments, the kick plate deploys by pivoting forward about a forward end thereof.

In some embodiments, the safety response device is inertially deployable by an inertial mass that pivots the kick plate upward automatically in response to deceleration greater than a threshold amount.

In some embodiments, a forward end of the kick plate is pivotally attached to the floor.

In some embodiments, the safety response device automatically stows the kick plate after deployment.

In some embodiments, the safety response device automatically stows the kick plate at a predetermined time following deployment.

In some embodiments, the safety response device includes cuffs that pivotally deploy forward of a leg rest of the aircraft seat to engage the feet or legs of a seat occupant.

In some embodiments, the safety response device includes a toe catch positioned forward of a leg rest of the aircraft seat.

In some embodiments, the safety response device automatically deflates the airbag after deployment.

In some embodiments, the safety response device is operable, when activated by the triggering system, to transition the legs of a seated occupant from an un-extended condition to an extended condition at a predetermined rate.

In some embodiments, the safety response device includes a leg rest mounted airbag.

In some embodiments, the safety response device includes an airbag that extends the legs of the seated occupant to the extended condition.

In some embodiments, the safety response device includes an actuator that pivots a leg rest of the aircraft seat thereby transitioning the legs of a seated occupant from the un-extended condition to the extended condition.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
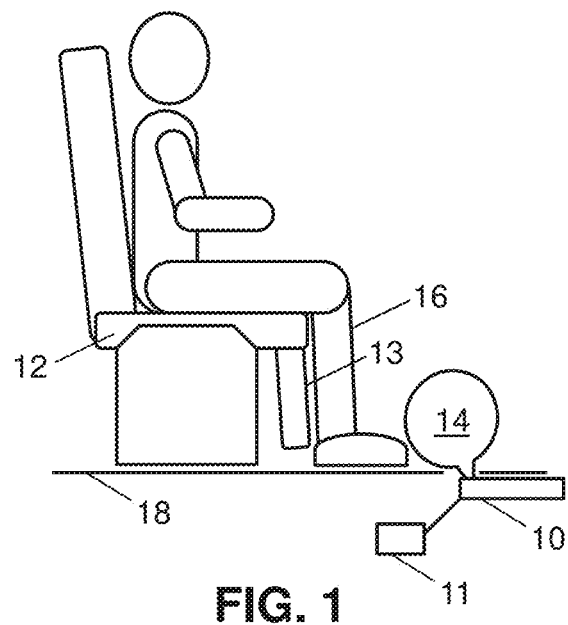
FIG. 1 is a side view of a safety system including a leg extension control airbag in use with a passenger seat, in a floor-mounted embodiment, deployed forward of the leg rest of the seat.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

In various embodiments, safety systems deploy safety response devices that protect passenger legs during an aircraft crash or other deceleration event. The safety response devices limit, prevent, control, or affect the leg extension condition of occupants of aircraft passenger seats. The safety response devices can deploy from floors, seats, or other fixed structures in passenger seating areas, wherein the term floor generically refers to a floor, plinth, panel, furniture or other structure. A leg extension condition of un-extended refers to the knees and lower legs (shins) as nearly vertical over the ankles corresponding to typical leg positions of a seated person with the knees bent and the lower leg to thigh angle being nearly ninety degrees, or between eighty and one hundred degrees for example. A leg extension condition of extended refers to the ankles as extended forward relative to the knees, with the knees straightened relative to the un-extended condition, corresponding to raised leg positions of a reclined or laying person.

In some examples, as represented in FIGS. 1-7 and 12-15, motion or repositioning of passenger legs from an un-extended condition during a vehicle crash or other rapid deceleration event is limited or prevented. For example, an airbag, a kick plate, or another motion-limiting device can automatically deploy from an aircraft floor, a passenger seat, and/or an aircraft bulkhead or other structure near a passenger seat. The safety response devices described herein that limit or prevent leg extension are useful to prevent injuries that could be caused by whipping or leg extension into or against forward structures. Deployed, the safety response devices described herein prevent passenger legs from extending violently forward, flailing, and/or contacting structures forward of seats during deceleration events such as crashes. These safety response devices are operable to maintain the legs of a seated occupant in an un-extended condition thereby protecting the legs from extending when a rapid deceleration occurs.

In other examples, as represented in FIGS. 8-11, the leg extension condition of a seat occupant is transitioned from un-extended to extended by actively applied motion control to place the legs into positions advantageous for safety in a rapid deceleration event. For example, the legs can be controllably and safely extended forward and placed into the destination positions that inertia would otherwise likely put them abruptly with flailing or whipping action. In embodiments that are not mutually exclusive, safety response devices can prevent forward swinging of the lower legs during a deceleration event; and safety response devices can lift and extend a seat occupant's legs early in a crash or other deceleration event in a controlled fashion to reduce shock loading of leg joints. A leg rest, for example, of an infinite setback seat can raise during taxi, takeoff, and landing (TTOL) so that the occupant's legs are already in an extended position during a deceleration event to prevent shock loading caused by dynamic extension of the legs.

The deployed devices as described herein may retract or break away after use to aid egress, for example following an aircraft crash after which evacuation should not be impeded by deployed devices. For example, airbags may automatically deflate soon after deployment, for example after a predetermined time, so as not to slow or impede passenger evacuation or escape from a vehicle such as an aircraft. Safety response devices may be static or deployed dynamically in various examples.

Safety response devices as described herein may be used in oblique angled seating arrangements where unrestrained leg or body flailing could cause injury. In use, the devices described herein, and their equivalents and variations within the scope of these descriptions, can control, limit, or prevent motion during a crash or other deceleration event to reduce injury potential. Furthermore, the devices and systems described herein could protect against injury potential in scenarios where the occupant would otherwise contact forward structure resulting in impact injuries. The devices and systems described herein may also be adapted to other industries beyond aircraft and aerospace.

Safety response devices according to these descriptions may include, or be activated by, acceleration sensors for triggering deployment. Additionally, or alternatively, safety response devices may be directly or indirectly connected with a native safety system within an aircraft. Such a safety system may include a control module that is programmed to send a triggering signal to a safety response device when a crash or other sudden deceleration event is detected. The triggering signal may cause safety response devices to activate and/or deploy, thereby controlling, limiting, or preventing the motion of lower limbs and other body portions.

Sensor redundancy, discriminating circuitry, and/or controller programming may be used to discriminate momentary, false, or spurious sensor signals received due to, for example, equipment vibrations, minor impacts or accelerations, and other undiagnosed events for which no safety device response is needed. Adjustable parameters such as delays may be used to cross-check or confirm sensor signals following a potential triggering event such as the receipt of a signal from a sensor. Such confirmation measures are implemented to avoid needlessly triggering safety response devices while assuring their deployment at the occurrence of a verified critical inertial event such as the rapid deceleration or crash of an aircraft.

In several of the drawings, deployed safety response devices are shown as airbags. The airbags may deploy by filling with gas released by a triggered rapid chemical reaction, such as the reaction of sodium azide ($NaN_3$) with potassium nitrate ($KNO_3$) to produce nitrogen gas. For example, in each of FIGS. 1-3, an airbag device is installed to deploy, upon triggering, an airbag forward of a passenger seat and the un-extended legs of a seated occupant to limit or prevent forward leg-extending motion of the lower legs of the passenger during a critical event. The airbags may automatically deflate soon after deployment.

Particularly in FIG. 1, a safety system for protecting passenger legs during an aircraft crash or other deceleration event includes a floor-mounted airbag device 10 installed forward of an aircraft passenger seat 12. The airbag device 10 deploys an airbag 14 forward of the leg rest 13 of the passenger seat and lower legs 16 of a seated occupant, thereby limiting or preventing forward leg-extending motion of the lower legs during a critical event. The airbag device 10, in stowed condition, can remain flush with or below the surface of the floor 18, low profile, out of sight, and out of way until deployment to avoid tripping and to maintain an appearance consistent with the environment, such as the passenger cabin of an aircraft. Labeling, informative graphics, and other indicia may be used to inform passengers of the need to keep the area above the undeployed airbag device free of luggage and other personal effects.

In FIG. 1, a control module or triggering system 11 is included with, or is in operative communication with, the airbag device 10, and is operative to send a triggering signal to a safety response device when a crash or other sudden deceleration event is detected. Furthermore, each safety system described herein with reference to FIGS. 2-15 can include such a control module or triggering system in operative communication with the respective safety response device(s). FIG. 16 depicts a circuit diagram representing a safety-response triggering system 100 incorporated, in non-limiting examples, into each of the safety response devices of FIGS. 1-15 in at least some exemplary implementations.

Figure 2:
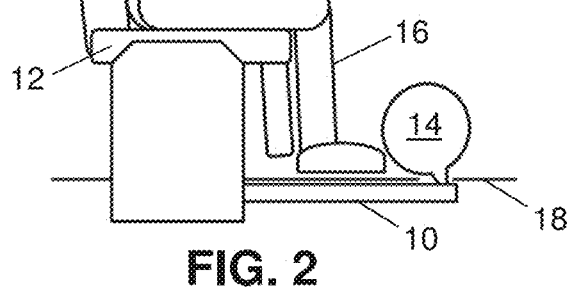
FIG. 2 is a side view of a safety system including a leg extension control airbag in use, in a seat-mounted embodiment, deployed forward of the leg rest of a seat.

In FIG. 2, a seat-mounted airbag device 10 is arranged to deploy an airbag 14 forward of the leg rest of the passenger seat 12 and the lower legs 16 of a seated occupant, thereby limiting or preventing forward leg-extending motion of the lower legs during a critical event. The airbag 14, in stowed condition, can remain flush with or below the surface of the floor 18, low profile, out of sight, and out of way until deployment. Labeling or informative graphics may be used to inform passengers of the need to keep the area above the undeployed airbag device free of luggage and other personal effects. Indicia may be used to instruct passengers to keep the area above the undeployed airbag free of luggage and other personal effects.

Figure 3:
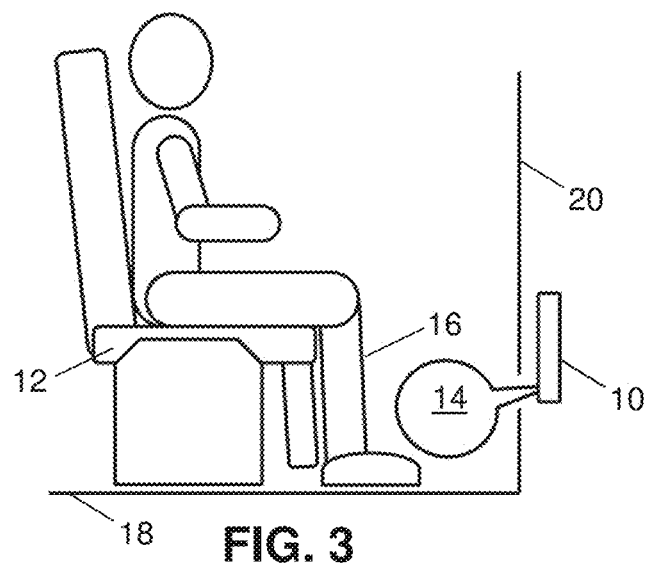
FIG. 3 is a side view of a safety system including a leg extension control airbag in use, in bulkhead-mounted embodiment, deployed forward of the leg rest of a seat.

In FIG. 3, an airbag device 10 is mounted in or upon a fixed structure 20 forward of the leg rest of the passenger seat 12 to deploy an airbag 14 forward of the lower legs 16 of a seated occupant. The fixed structure 20 may represent, for example, a partition wall between passenger cabin areas or passenger suites of an aircraft, or a bulkhead of an aircraft fuselage. The airbag device 10, in stowed condition can remain flush with or behind a wall surface or remain otherwise visibly consistent in appearance with the environment. Indicia may be used to instruct passengers to keep the area between the seat and the fixed structure free of luggage and other personal effects to safely permit proper inflation of the airbag in the event deployment is needed.

Figure 4:
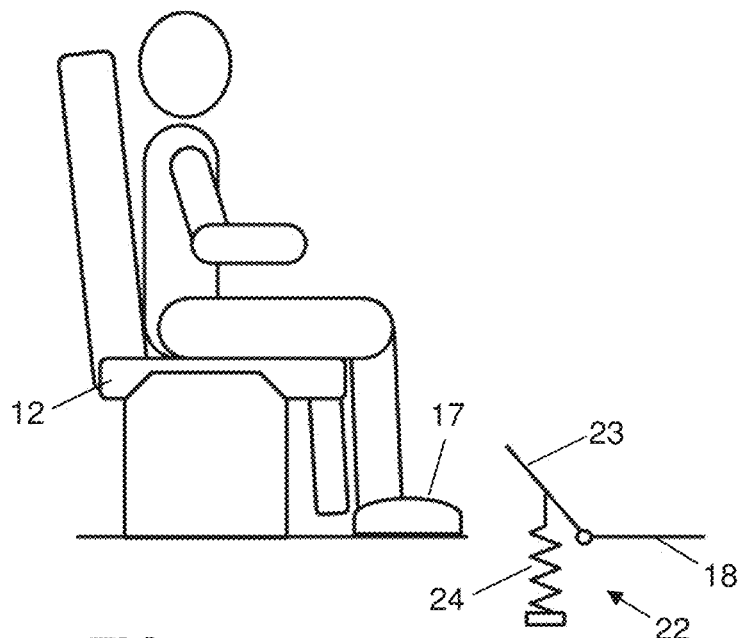
FIG. 4 is a side view of a safety system including a leg extension control kick plate, in a forward pivoting embodiment, deployed forward of the leg rest of a seat.
Figure 5:
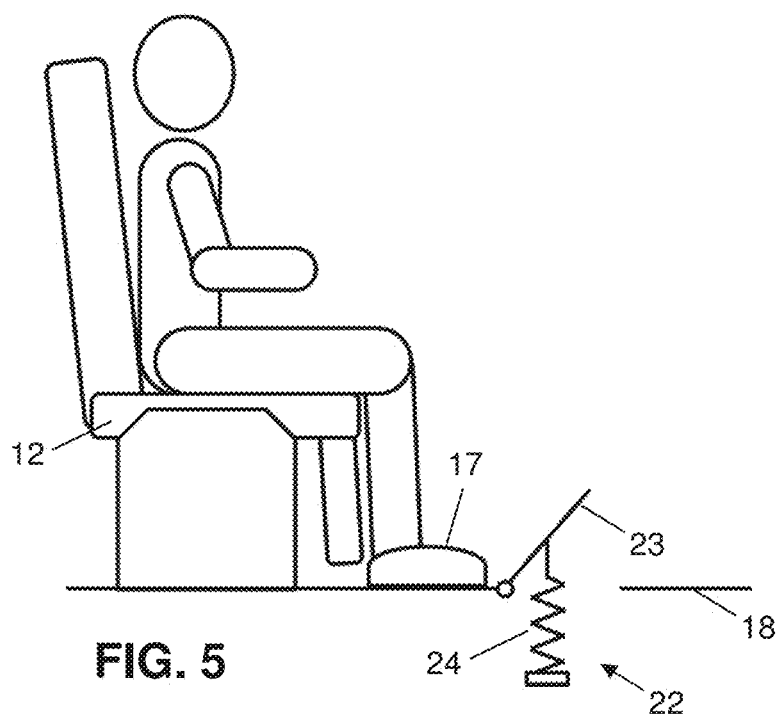
FIG. 5 is a side view of a safety system including a leg extension control kick plate, in a rearward pivoting embodiment, deployed forward of the leg rest of a seat.

In FIGS. 4-5, deployed safety response devices are shown as airbags. In each a floor-mounted kick plate device 22 is installed forward of the leg rest of a passenger seat to deploy a kick plate 23 upward from the floor 18 forward of the feet 17 of a seated occupant. By positioning the kick plate 23 forward of the feet of the passenger, forward leg-extending motion of the lower legs is limited or prevented upon deployment during a critical event. The kick plate 23, in stowed condition, can remain flush with or below the surface of the floor 18, low profile, out of sight, and out of way until deployment. The kick plate thus can have a planar upper surface to match the floor.

The kick plate 23 is pivotally attached to the floor 18 by a hinge and pivots upward upon deployment. FIG. 4 illustrates the kick plate device 22 as mounted for forward pivoting of the kick plate 23, in which case a forward end of the kick plate is pivotally attached to the floor. FIG. 5 illustrates the kick plate device 22 as mounted for rearward pivoting of the kick plate 23, in which case a rearward end of the kick plate is pivotally attached to the floor 18. In each, the kick plate 23 can be deployed by the force of varying actuator types in varying embodiments.

In some examples, the kick plate device 22 includes other actuator types such as pyrotechnic devices. For example, a pyrotechnic charge, termed a squib in some industries, can be electrically ignited by a triggering signal from an acceleration sensor or a safety system that detects a critical event. In the illustrated examples, the kick plate device 22 includes a spring actuator or other biasing component. The illustrated kick plate 23 is biased to the pivotally raised deployed position by a spring 24 that expands as the kick plate 23 deploys. In the stowed condition of the kick plate 23, the spring is compressed. A catch, latch, or other releasable mechanism maintains the kick plate 23 as stowed and flush with the floor surface until a release condition is met. In a mechanically triggered example, the kick plate device 22 is released by an inertially actuated mechanism that opens latch during critical event level deceleration for example. In another example, a solenoid actuator opens the latch permitting the spring to expand to deploy the kick plate 23.

The biasing component may be reset to a biased state and stowed condition of the kick plate device by applying a downward force on the deployed kick plate, thus pivotally returning the kick plate 23 to the stowed and latched position. The kick plate device 22 may be automatically reset to its stowed condition at a predetermined time following a triggering event. An automatic return to the stowed condition may advantageously allow passengers to evacuate unimpeded by any floor mounted motion limiting devices deployed out of the floor of an aircraft cabin.

Figure 6:
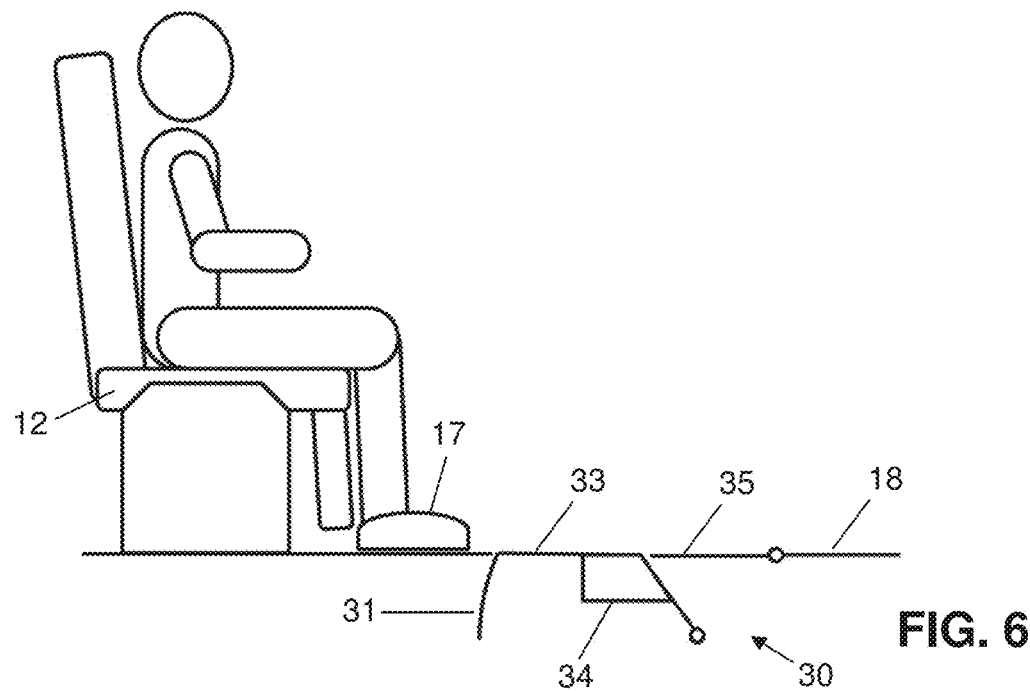
FIG. 6 is a side view of a safety system including a leg extension control kick plate, according to an inertia deployed embodiment, stowed forward of the leg rest of a seat.
Figure 7:
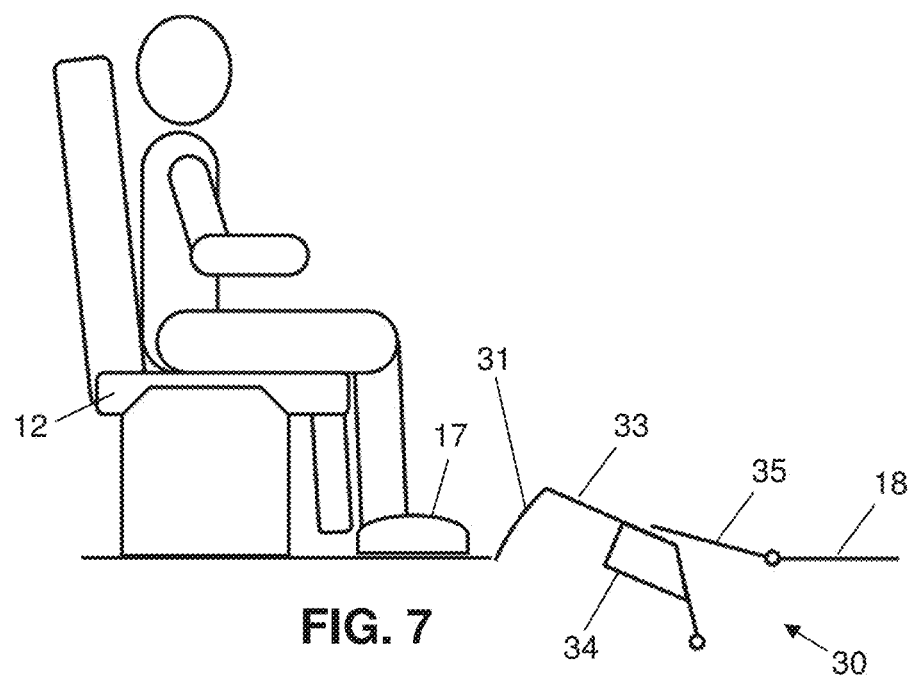
FIG. 7 is a side view of the safety system of FIG. 6 with the leg extension control kick plate shown deployed.

FIGS. 6 and 7 show a safety response device as an inertially deployable kick plate device 30. The floor-mounted kick plate device 30 is installed forward of the leg rest of a passenger seat 12 to deploy a kick plate 31 forward of the feet 17 of a seated occupant, thereby limiting or preventing forward leg-extending motion of the lower legs during a critical event. The kick plate device 30, in stowed condition (FIG. 6), can remain flush with or below the surface of the floor 18, low profile, out of sight, and out of way until deployment.

The kick plate device 30 includes a rearward main device 33 that carries the kick plate 31. The forward end of the main device is pivotally mounted to a fixed structure such as a fuselage subfloor frame element. A ballast 34 serving as an inertial mass causes the rearward main device to pivot upward and forward automatically by inertial force as deceleration greater than a threshold occurs, thereby deploying the kick plate device 30 to the deployed condition (FIG. 7). This raises the rearward kick plate 31 forward of the feet 17 of a seated occupant. The kick plate device 30 automatically returns to the stowed condition (FIG. 6) as deceleration subsides. The kick plate device 30 includes a forward spanner plate 35, pivotally attached to the floor, that closes out a forward gap between the floor 18 and forward end of the main device 33 as the kick plate device deploys.

FIGS. 8-11 show safety response devices that, upon deployment, move the legs of a seated occupant into positions that inertia would otherwise force them abruptly, so that the legs are already in an extended position during a deceleration event to prevent shock loading caused by dynamic extension of the legs. These safety response devices are operable to transition the legs of a seated occupant from an un-extended condition to an extended condition at a predetermined rate.

Figure 8:
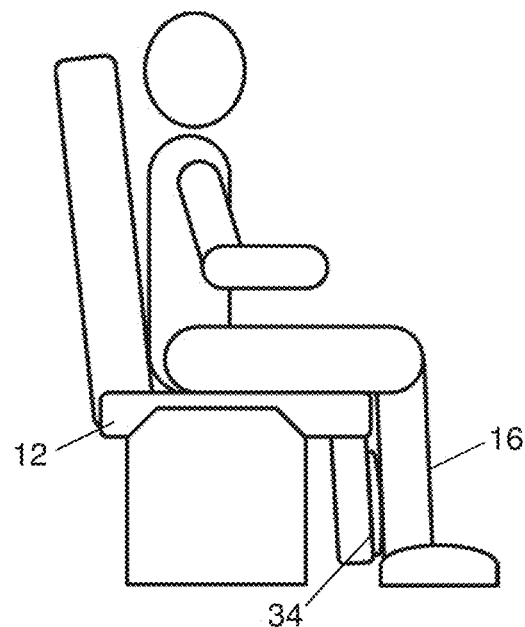
FIG. 8 is a side view of a safety system including a leg extension control airbag, in a leg rest mounted embodiment, in a stowed condition.
Figure 9:
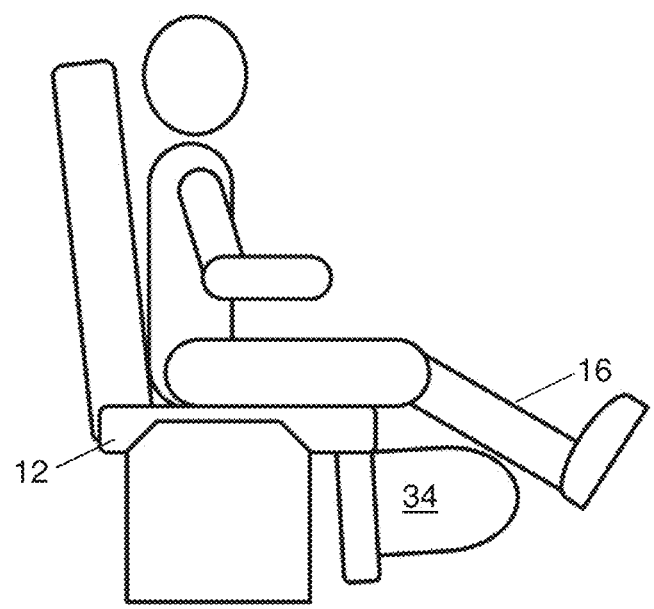
FIG. 9 is a side view of the safety system of FIG. 8, with the leg extension airbag shown deployed.

FIGS. 8 and 9 show a safety response device as a leg rest mounted airbag 34, shown in a stowed condition and an inflated deployed condition respectively. In FIGS. 8 and 9, the airbag 34 applies forward motion to the lower legs 16 of a seated occupant, extending the legs to a more forward, raised and extended position advantageous for safety in a rapid deceleration event. The airbag 34 deploys (FIG. 9) between the leg rest and legs, thereby extending the legs at a predetermined rate.

Figure 10:
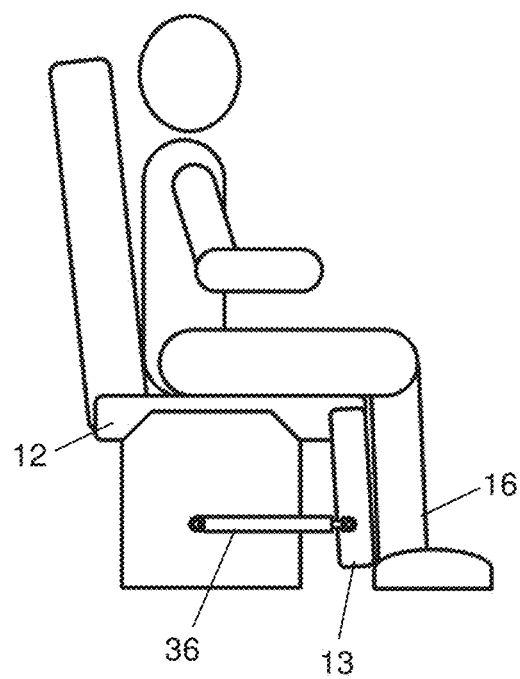
FIG. 10 is a side view of a safety system including a leg extension control actuator, in a leg rest mounted embodiment, shown in a stowed condition.
Figure 11:
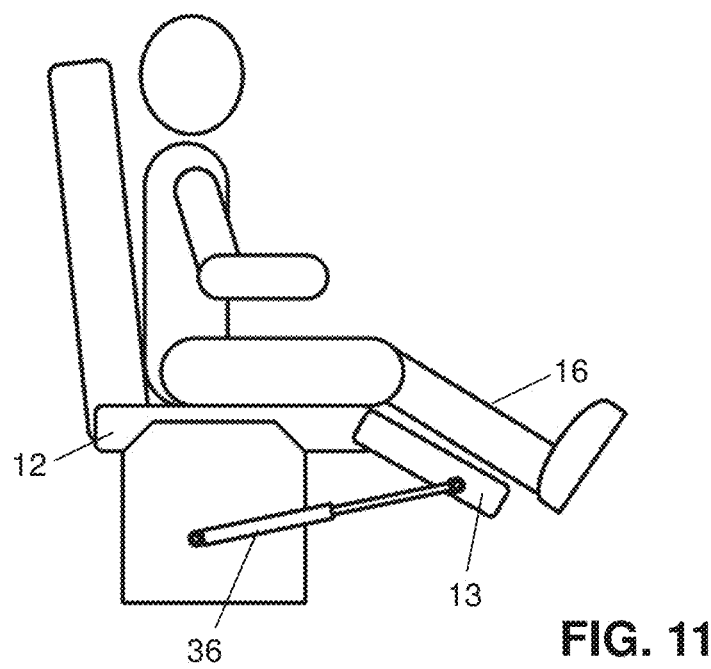
FIG. 11 is a side view of the safety system of FIG. 10 with the leg extension control actuator shown deployed.

FIGS. 10 and 11 show a safety response device as a leg rest mounted actuator 36, shown in a withdrawn stowed condition and an extended deployed condition respectively. In FIGS. 10 and 11, the actuator applies forward motion to the lower legs of a seated occupant by way of a pivoting leg rest 13. A rearward end of the actuator is pivotally connected to a seat frame or other fixed structure. A forward end of the actuator is pivotally connected to the pivoting leg rest 13. The linear actuator 36 can be a gas-filled cylinder that expands upon triggering, or a linearly extending electrical solenoid device, or other linearly extending actuator. As the actuator 36 extends, the leg rest 13 is pivoted upward from a near vertical lower position (FIG. 10) to a higher relatively raised and rearwardly inclining position (FIG. 11) at a predetermined rate.

Figure 12:
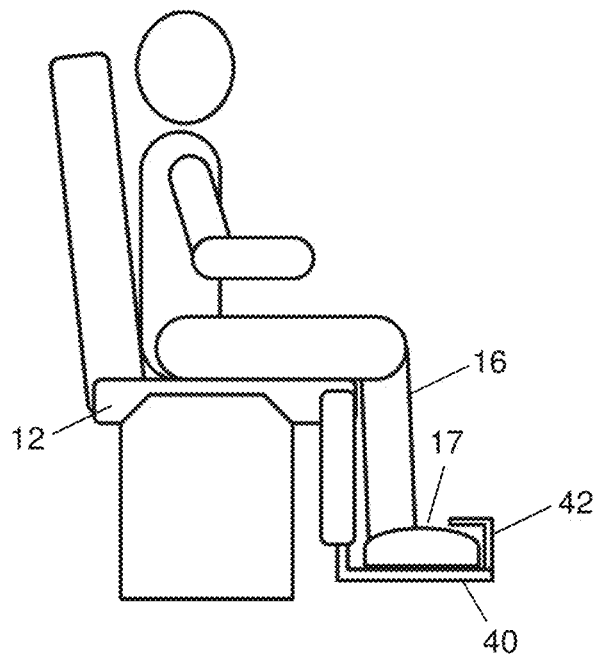
FIG. 12 is a side view of a safety system including a leg extension restraint device, in a toe catch embodiment, mounted on the leg rest of a seat.

FIG. 12 shows a safety response device as a seat-mounted foot engaging restraint 40 having a toe catch 42 forward of the leg rest of the passenger seat 12. The foot engaging restraint 40 may be actively deployable or static. In a deployable example, the toe catch 42 pivots upward from a stowed position to the illustrated deployed position. The toe catch 42 may break away or retract for passenger egress. The foot restraint 40 and toe catch 42 maintain a seated occupant's feet 17 lower legs 16 in an un-extended condition and limit or prevent forward leg-extending motion of the lower legs during a critical event.

Figure 13:
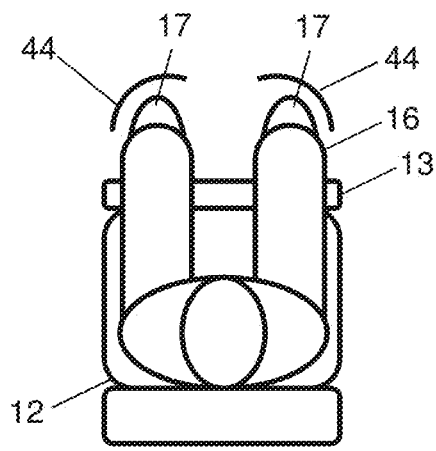
FIG. 13 is a top view of a safety system including a leg extension restraint device, in a lower-leg engaging embodiment.

FIG. 13 shows a safety response device as seat-mounted leg engaging restraint system having cuffs 44 that engage the feet 17 and/or lower legs 16 forward of the leg rest of the passenger seat. This restrains the lower legs between the leg rest 13 and cuffs 44. The cuffs 44 may be actively deployable or static. In a deployable example, the pivot inward toward the passenger legs 16 upon deployment. The cuffs 44 may break away or retract for passenger egress. The cuffs 44 maintain a seated occupant's legs 16 in an un-extended condition and limit or prevent forward leg-extending motion of the lower legs during a critical event. The cuffs 44 may be contoured to correspond approximately to a passenger's lower legs.

Figure 14:
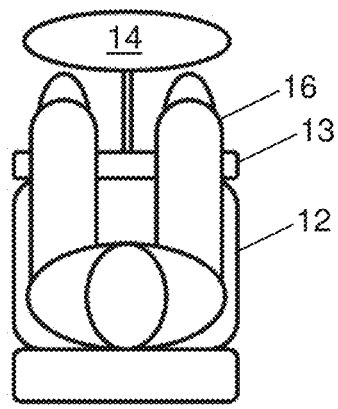
FIG. 14 is a top view of a safety system including a leg extension control airbag, in another seat mounted embodiment, that deploys between passenger legs.

FIG. 14 shows a safety response device as a seat-mounted airbag device arranged to deploy an airbag 14 forward of the leg rest of a passenger seat 12 and the lower legs 16 of a seated occupant, thereby limiting or preventing forward leg-extending motion of the lower legs during a critical event. The airbag device can be, for example, mounted in the leg rest 13 of the seat, or below the seat pan, to deploy the airbag 14 forward of the legs of the passenger.

Figure 15:
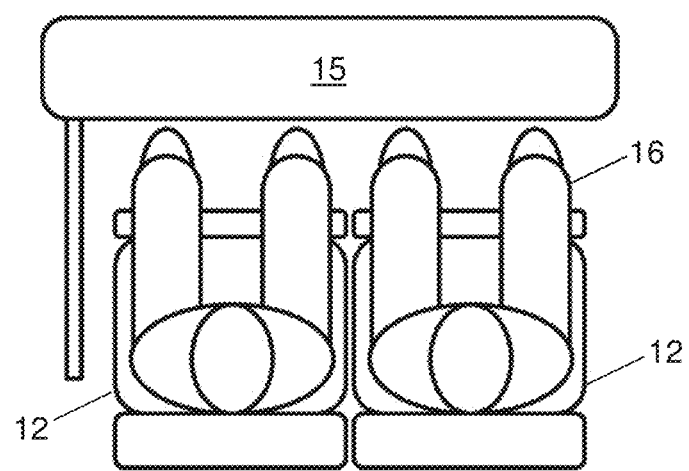
FIG. 15 is a top view of a safety system including a leg extension control airbag, in a multi-passenger embodiment, that deploys forward of the legs of multiple passengers.
Figure 16:
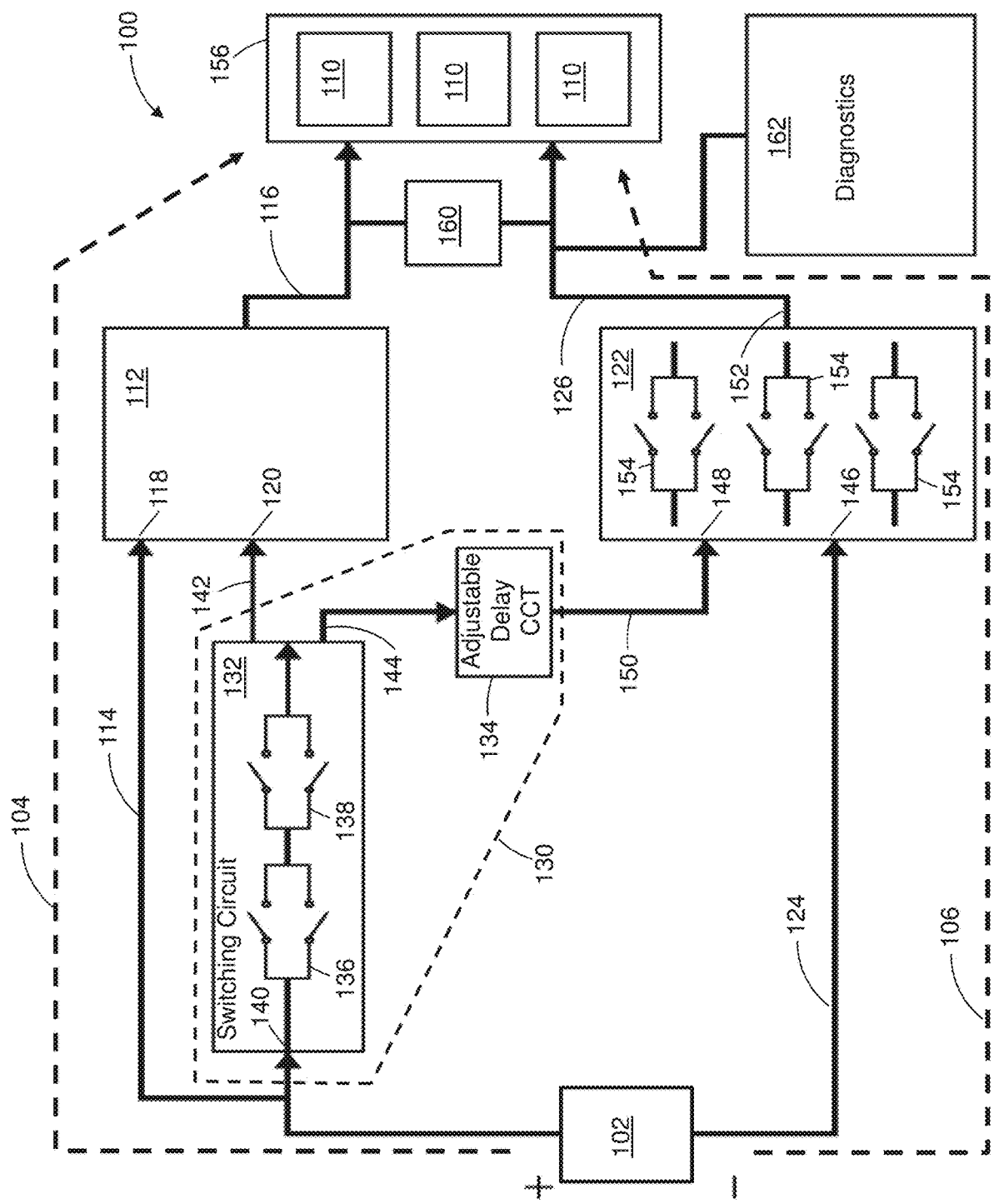
FIG. 16 is a circuit diagram representing a triggering system, according to the present disclosure, operable for activating one or more safety-response devices when a critical inertial event is determined.

FIG. 15 shows a safety response device as an airbag device arranged to deploy an airbag 15 forward of the leg rests of multiple adjacent passenger seats 12 and the lower legs 16 of corresponding seated occupants, thereby limiting or preventing forward leg-extending motion of the lower legs during a critical event. The airbag device can be, for example, mounted in a fixed structure adjacent the seats, such as an end bay, passenger cabin wall, or suit sidewall.

Each of the above-described safety response devices may be automatically reset to a stowed, uninflated, or undeployed condition at a predetermined time following triggering by a critical event. An automatic return to the undeployed condition may advantageously allow passengers to egress unimpeded by any space restriction, such as that of an inflated airbag or a kick plate deployed from a floor.

Each above-described safety response device can include or be in operative communication with a control module or triggering system that is operative to send a triggering signal to a safety response device when a crash or other sudden deceleration event is detected. FIG. 16 depicts a circuit diagram representing a safety-response triggering system 100, according to the present disclosure. The triggering system 100 is operable for activating the safety response devices described in the preceding when an acceleration impulse meets or exceeds a predetermined magnitude threshold for at least an adjustable duration threshold. The triggering system 100 can respond to a critical inertial event according to the magnitude and duration thresholds while discriminating against acceleration impulses having either lesser magnitudes or durations. The triggering system 100 includes one or more safety response devices that are triggered by receipt of a voltage differential provided by a DC power supply 102, such as a battery. Two conducting paths along which an electrical connection from the power supply to the safety response devices are represented in FIG. 1 as needed for a closed DC circuit to be selectively completed. A first path is referenced as a high-side path 104 and a second path is referenced as a low-side path 106, which are termed according respectively to electropositive (+) and electronegative (−) relative DC voltage levels of the electrical power supply. Variations within the scope of these descriptions include examples in which the relative DC voltage levels are reversed.

Furthermore, these descriptions refer to the DC power supply 102 side of the triggering system 100 as generally upstream and the safety response devices 110 as generally downstream without necessarily referring to electrical current flow directions, which are typically defined as opposite the direction of electron flow in a circuit or conductor segment. In that sense, the high-side path 104 and low-side path 106 have respective upstream and downstream portions delineated by switching devices that selectively propagate voltage "signals" from the power supply 102 downstream to the safety response devices 110.

It should also be understood that physical implementations of safety-response triggering systems according to FIG. 16 and descriptions thereof herein need not appear as in the drawing with regard to placement of real components. Those of ordinary skill in the art recognize that equivalent circuits according to a circuit diagram can vary in physical geometry and construction. In particular, upstream to downstream connectivity or propagation appears generally left-to-right in FIG. 16 for illustration purposes without implication on physical implementations of safety-response triggering systems according thereto.

Additionally, the term signal is broadly used herein to refer to connectivity as in closed circuit conditions for voltage propagation and current flow. In that sense, for example, a battery can be described as providing a signal to a switch, and when the switch is in a conducting condition, the switch propagates the signal from the battery to downstream devices.

In FIG. 16, a first or high-side switching device 112 between the DC power supply 102 and the safety response devices selectively electrically connects an upstream portion 114 of the high-side path 104 to a downstream portion 116 of the high-side path 104. Similarly, a second or low-side switching device 122 between the DC power supply 102 and the safety response devices 110 selectively electrically connects an upstream portion 124 of the low-side path 106 to a downstream portion 126 of the low-side path 106. Circuit completion to trigger the safety response devices 110 occurs when continuity or connection is made simultaneously through the low-side switching device 122 and high-side switching device 112 thereby applying a voltage differential to the safety response devices 110.

A switch control subsystem 130, which includes an inertial switch circuit 132 and a delay device 134, controls the connectivity status of the high-side and low-side switching devices 112 and 122. Upstream of the switching devices, the inertial switch circuit 132 includes at least one sensor, such as an acceleration sensor operative to detect an acceleration impulse. Two sensors are illustrated and referenced as a first sensor 136 and a second sensor 138 representing that any number of sensors can be included. The two sensors 136 and 138 are illustrated arranged in an electrical series connection or relation to each other to provide the assurance of redundancy in any connectivity or signal conveyed by the inertial switch circuit 132. The inertial switching circuit 132 can include the sensors and drive circuitry according to the type of sensors used.

The sensors 136 and 138 are operative to detect changes in velocity of structures to which the sensors are connected or coupled, such as the components of passenger seats, the structures in an aircraft passenger cabin, or other structures of the aircraft overall such as fuselage and frame elements. The sensors are operative to detect high G-force events and may include any combination of multi-axis accelerometers, gyroscopes, and magnetometers, among others. In some implementations, accelerometers may be configured measure an amount of acceleration in a particular direction, gyroscopes may be configured to measure changes in orientation or relative velocity, and magnetometers measure changes in magnetic fields that can be used to determine absolute orientation of the elements to which the magnetometers are connected. Because accelerometers, gyroscopes, and magnetometers may be used to measure different features of inertial movement, the sensor outputs may be combined into or may otherwise contribute to connectivity or an output emitted or generated by the inertial switch circuit 132.

In a particular conceived example, the first and second sensors 136 and 138 are ball and spring type acceleration switches that are generally maintained in a non-conducting condition in which a spring biases a ball from a conducting position. Such switches achieve electrically conducting conditions when actuated by acceleration greater than a predetermined magnitude threshold and return to non-conducting condition when the acceleration reduces below the threshold. The magnitude threshold of each such sensor can be predetermined, for example, by the spring constant of the spring and by the geometry of the device. In such a device, the ball, serving as an inertial mass, moves against the force of the spring to a conducting position to provide connectivity by either direct conduction through the ball or by otherwise engaging or actuating a switch with the ball during an inertial event. Thus, the magnitude threshold can be predetermined by selection of the acceleration sensors used or by adjustment of an acceleration sensors. The benefit of the series connection of two or more sensors that respond to an inertial incident is that a signal or connectivity is passed through the series connection only when all sensors in the signal path are in a conducting condition concurrently responding to an acceleration event.

An upstream input 140 of the inertial switch circuit 132 is electrically connected to the DC power supply 102 by way of the upstream portion 114 of the high-side path 104. Upon actuation of all series connected sensors in the inertial switch circuit 132, connectivity from the input to the outputs of the inertial switch circuit 132 is provided by the inertial switch circuit 132. A first output 142 of the inertial switch circuit 132 is routed or connected to the high-side switching device 112. A second output 144 of the inertial switch circuit 132 is routed or connected to the adjustable delay device 134, and, downstream of the delay device 134, to the low-side switching device 122.

An upstream first input 146 of the low-side switching device 122 is electrically connected to the DC power supply 102 by the upstream portion of the low-side path 106. A second input 148 of the low-side switching device 122 is electrically connected to the output 150 of the delay device 134. An output of the low-side switching device 122 is routed to the downstream safety response devices 110 by the downstream portion 126 of the low-side path 106. The low-side switching device 122 is represented in FIG. 16 as having multiple gated switches 154, each of which is in specific correspondence and respective electrical communication with a downstream safety response device 110. The gated switches 154 are generally maintained in non-conducting conditions, and are switched to conducting conditions upon receipt of connectivity or signal at the second input from second output of the inertial switch circuit 132 by way of the delay device 134. The gated switches 154 can be, for example, field-effect transistors (FETs) gated by the output 150 of the delay device 134.

The downstream portion 126 of the low-side path 106 can be a single conductance path as expressly illustrated in FIG. 16, or, in various embodiments, can include numerous channels in one-to-one correspondence with the individual safety response devices 110 or predetermined groups thereof. Similarly, the downstream portion 116 of the high-side path 104 can be a single conductance path as expressly illustrated in FIG. 16, or, in various embodiments, can include numerous channels in one-to-one correspondence with the individual safety response devices 110 or predetermined groups thereof.

An upstream first input 118 of the high-side switching device 112 is electrically connected to the DC power supply 102 by the upstream portion 114 of the high-side path 104. A second input 120 of the high-side switching device 112 is electrically connected to the first output 142 of the inertial switch circuit 132. An output of the high-side switching device 112 is routed to the downstream safety response devices 110 by the downstream portion 116 of the high-side path 104. The high-side switching device 112 is generally maintained in a non-conducting condition between the upstream portion 114 and downstream portion 116 of the high-side path 104. However, upon receipt of connectivity or signal from the first output 142 of the inertial switch circuit 132, the high-side switching device 112 is switched to a conducting condition.

The high-side switching device 112, in at least one embodiment similar to the low-side switching device 122, has multiple gated switches, each of which is in specific correspondence and electrical communication with a downstream safety response device 110. Other embodiments of at least the high-side switching device 112 are within the scope of these descriptions. In any embodiment, switchable connectivity from the power supply device 102 to each safety response device 110 is provided along the high-side path 104 by the high-side switching device 112 under control of the switch control subsystem 130, and along the low-side path 106 by the low-side switching device 122 under control of the switch control subsystem. Advantageous individually switched control of each safety response device 110 can be provided by both or either one of the low-side switching device 122 and high-side switching device 112. In the illustrated embodiment of the safety-response triggering system 100, the low-side switching device 122 is expressly illustrated as having multiple gated switches 154 in one-to-one correspondence and electrical communication with the safety response devices 110 to represent that at least the low-side switching device 122 provides the advantageous individual switched control of each safety response device or groupings thereof.

The delay device 134 generally receives a signal from the second output 150 of the inertial switch circuit 132 and subsequently, at the expiration of a time delay, propagates the signal, or sends a corresponding generated signal, to the low-side switching device 122 prompting a conducting condition from the upstream portion 124 to the downstream portion 126 of the low-side path 106. The counting of the time delay is initiated upon receipt of the signal from the inertial switch circuit 132. The time delay has an adjustable duration. Thus, the signals sent by the delay device 134 to the low-side switching device 122 lag the signals received from the inertial switch circuit 132 by the adjustable time delay. The time delay can be adjusted, for example, by modifying the values of resistors during post production testing to assure a desired predetermined time delay in accordance with the particular safety response devices 110 used and how they are to be utilized.

The safety response devices 110 are activated or triggered when the low-side switching device 122 and high-side switching device 112 are concurrently in conducting condition, permitting connectivity concurrently along the high-side path 104 and low-side path 106. This defines a completed circuit from the power supply 102 to the safety response devices 110, applying a voltage differential to the safety response devices 110 thereby activating the safety response devices 110. The delay device 134 introduces a time delay in the second input 148 of the low-side switching device 122 relative to the second input 120 of the high-side switching device 112 to prevent the triggering of safety response devices 110 in the event of momentary false or spurious signals at the outputs of the inertial switch circuit 132. Any connectivity or signal initiated at the inertial switch circuit 132 having a duration less than the time delay introduced by the delay device 134 will result in non-concurrent signals at the second inputs of the low-side and high-side switching devices due to expiration of the signal at the high-side switching device 112 before expiration of the time delay, preventing the safety response devices 110 from activating.

The multiple safety response devices 110 may be triggered at once or in a desired sequence individually or in groups thereof. The safety response devices 110 as illustrated in an array 156 in FIG. 16 to represent that any number of safety response devices can be used. The safety response devices 110 can be devices of any type that responds to respective triggering signals with active responses that provide or assist passenger or equipment security and safety. For example, the safety response devices 110 can include pyrotechnic actuators, which are termed squibs in some industries, and thus may include, among other components, an electrically ignited pyrotechnic charge. Small pyrotechnic actuators can typically exert significant force (tens or hundreds of pounds) and achieve actuation speeds as low as several milliseconds. The safety response devices 110 can be or can include other types of actuators, such as linear solenoids. A linear solenoid can exert a significant force in a short time period responding an applied current, and can be used repeatedly without replacement in some implementations.

The safety response devices 110 in FIG. 16 can be any and all of the safety responses described above with reference to FIGS. 1-15, including: the airbag devices 10 of FIGS. 1-3; the kick plate device 22 of FIGS. 4-5; the kick plate device 30 of FIGS. 6-7; the airbag 34 of FIGS. 8-9; the actuator 36 of FIGS. 10-11; the foot engaging restraint 40 and toe catch 42 of FIG. 12; the leg engaging restraint system of FIG. 13 having cuffs 44; and the airbags 14 and 15 of FIGS. 14 and 15, respectively.

An indicator 160 may be provided, as shown in FIG. 1, to alert or inform a user, installer, or maintenance technician as to the operational status of the safety-response triggering system 100 and/or individual safety response devices 110 for example. The indicator 160 may for example include light emitters such as LEDs in one-to-one correspondence with the safety response devices 110 to visibly indicate the status of each device. In FIG. 16, the indicator 160 is shown electrically connected by respective connectors to the downstream portions 126 and 116 of the low-side path 106 and high-side path 104, upstream of and in parallel relation to the safety response device array 156.

A diagnostics subsystem 162 can also be provided, as represented in FIG. 16, as an on-board or remote system. The diagnostic subsystem 162 can display, record, relay, and/or analyze the same information provided by the indicator 160 and additional information as well. The diagnostics subsystem 162 is shown as connected to the downstream portion 126 of the low-side path 106 upstream of the safety response device array 156. In other embodiments, the diagnostics subsystem 162 is in further communication with other components of the triggering system 100 so as to permit utilization of status information on other or all other components. This may be particularly advantageous to permit analysis of events associated with any triggering of one or more of the safety response devices 110 and to permit analysis of any events in which triggering did not occur properly.

By adjustment of the time delay introduced by the delay device 134, the triggering system 100 can be used in various applications and with various safety response device types, all with differing time requirements. Also, various types of acceleration switches can be used in the inertial switching circuit 132 and their varying time response functions, by which spurious events are to be discriminated to prevent unwanted safety response device activation, can be accommodated by adjustment of the time delay. The adjustable time delay defines a duration threshold, predetermined by adjustment, by which a critical inertial event is determined and by which acceleration impulses of lesser duration are discriminated. Any connectivity or signal initiated at the inertial switch circuit 132 having a duration less than the time delay will result in non-concurrent signals at the switching devices, preventing the safety response devices 110 from activating. The triggering system 100 provides an alternative and safer approach relative to firing an airbag, for example, at a threshold acceleration magnitude regardless of duration.

The inertial switch circuit 132 discriminates against acceleration impulses below a predetermined magnitude threshold. The time delay device 134, cooperatively with the low-side switching device 122 and high-side switching device 112, discriminates against acceleration impulses that are shorter-lived than an adjustable duration threshold. Thus, the safety-response devices 110 are activated only when a critical inertial event is determined according to the magnitude and duration thresholds, while discriminating against lesser magnitude and duration acceleration impulses. The triggering system 100 therefore effectively filters outs short time vibrations caused by minor incidental impacts and other non-impact related accelerations while assuring the triggering system 100 responds to critical inertial events with a predetermined response by activating the safety response devices 110.

The triggering system as illustrated can advantageously be battery powered and consumes no power from the battery in standby mode, referring to quiescence in which no acceleration impulses exceed the magnitude thresholds of the acceleration sensors at the inertial switching circuit 132. The triggering system can thus have a long service life after installation assuming no or few critical inertial events occur.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A safety system for protecting the legs of an occupant of an aircraft seat, the safety system comprising:
 a safety response device positioned in a floor forward of and proximal to an aircraft seat, the safety response device operable to deploy thereby controlling a leg extension condition of legs of an occupant of the aircraft seat; and
 a triggering system operable to activate the safety response device when a threshold deceleration is exceeded; and
 wherein the safety response device is a kick plate device, comprising:
  a main device pivotally mountable to a floor element;
  a kick plate coupled to the main device; and
  an inertial mass coupled to the main device operative to cause the main device to pivot upward and forward by inertial force when the deceleration exceeds the threshold deceleration.

2. The safety system according to claim 1, wherein, the safety response device is operable, when activated by the triggering system, to maintain the legs of a seated occupant in an un-extended condition thereby protecting the legs from extending when a rapid deceleration occurs.

3. The safety system according to claim 1, wherein, the safety response device is floor-mounted, and, when in a stowed and undeployed condition thereof, is flush with or below a surface of the floor forward of the aircraft seat.

4. The safety system according to claim 1, wherein, the safety response device automatically stows the kick plate as the deceleration subsides below the threshold deceleration.

5. The safety system according to claim 1, wherein, the safety response device automatically stows the kick plate at a predetermined time following deployment.

6. The safety system according to claim 1, further comprising a spanner plate positioned forward of the kick plate device and pivotally attachable to the floor, the spanner plate operative to close out a gap formed between the floor and a forward end of the main device as the kick plate device deploys.

\* \* \* \* \*